US011241830B2

(12) United States Patent
Ewald et al.

(10) Patent No.: US 11,241,830 B2
(45) Date of Patent: Feb. 8, 2022

(54) BUILD MATERIAL SPREADERS

(71) Applicant: HEWLETT-PACKARD DEVELOPMENT COMPANY, L.P., Spring, TX (US)

(72) Inventors: Brent Ewald, Vancouver, WA (US); Arthur H. Barnes, Vancouver, WA (US); Michael Crockett, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,414

(22) PCT Filed: Jan. 11, 2018

(86) PCT No.: PCT/US2018/013382
§ 371 (c)(1),
(2) Date: Oct. 25, 2019

(87) PCT Pub. No.: WO2019/139594
PCT Pub. Date: Jul. 18, 2019

(65) Prior Publication Data
US 2020/0346404 A1 Nov. 5, 2020

(51) Int. Cl.
*B29C 64/218* (2017.01)
*B29C 64/165* (2017.01)
*B29C 64/245* (2017.01)
*B29C 64/153* (2017.01)
*B33Y 30/00* (2015.01)
*B29C 64/264* (2017.01)

(52) U.S. Cl.
CPC .......... *B29C 64/218* (2017.08); *B29C 64/153* (2017.08); *B29C 64/165* (2017.08); *B29C 64/245* (2017.08); *B29C 64/264* (2017.08); *B33Y 30/00* (2014.12)

(58) Field of Classification Search
CPC ... B29C 64/141; B29C 64/153; B29C 64/165; B29C 64/218
See application file for complete search history.

(56) References Cited

U.S. PATENT DOCUMENTS

| 3,086,577 | A | | 4/1963 | Gimple | |
|---|---|---|---|---|---|
| 5,063,014 | A | * | 11/1991 | Cakmakci | B29C 43/224 264/151 |
| 5,387,380 | A | * | 2/1995 | Cima | B41J 2/09 264/69 |
| 6,905,645 | B2 | * | 6/2005 | Iskra | B33Y 10/00 264/128 |

(Continued)

FOREIGN PATENT DOCUMENTS

| CN | 101885062 A | 11/2010 |
|---|---|---|
| CN | 104308148 A | 1/2015 |

(Continued)

*Primary Examiner* — Atul P. Khare
(74) *Attorney, Agent, or Firm* — Fabian VanCott

(57) ABSTRACT

An apparatus may, in an example, include a build platform to receive a dose of build material and a build material spreader to spread the dose of build material over a length of the build platform wherein lateral portions of the build material spreader have a diameter smaller than a medial portion of the build material spreader.

15 Claims, 15 Drawing Sheets

(56) References Cited

U.S. PATENT DOCUMENTS

| | | | |
|---|---|---|---|
| 7,113,730 B2* | 9/2006 | Park | G03G 15/104 |
| | | | 399/237 |
| 8,568,124 B2 | 10/2013 | Brunermer | |
| 10,105,894 B1* | 10/2018 | Smiddy | B29C 64/218 |
| 10,449,710 B2* | 10/2019 | Susnjara | B29C 64/194 |
| 10,549,477 B2* | 2/2020 | Susnjara | B29C 64/194 |
| 10,786,946 B2* | 9/2020 | Susnjara | B29C 64/118 |
| 2003/0143268 A1 | 7/2003 | Lewis et al. | |
| 2004/0003741 A1 | 1/2004 | Iskra et al. | |
| 2008/0006958 A1 | 1/2008 | Davidson | |
| 2017/0021565 A1 | 1/2017 | Deaville | |
| 2017/0165909 A1* | 6/2017 | Hakkaku | B29C 64/188 |
| 2018/0001559 A1 | 1/2018 | Paternoster et al. | |
| 2018/0215079 A1* | 8/2018 | Hakkaku | B29C 64/245 |

FOREIGN PATENT DOCUMENTS

| | | |
|---|---|---|
| CN | 205767020 U | 12/2016 |
| KR | 20100133829 A | 12/2010 |
| WO | WO2017005301 A1 | 1/2017 |
| WO | WO2017196337 A1 | 11/2017 |

* cited by examiner

BUILD MATERIAL SPREADERS

BACKGROUND

Additive manufacturing systems produce three-dimensional (3D) objects by building up layers of material and combining those layers using adhesives, heat, chemical reactions, and other coupling processes. Some additive manufacturing systems may be referred to as "3D printers." 3D printers and other additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
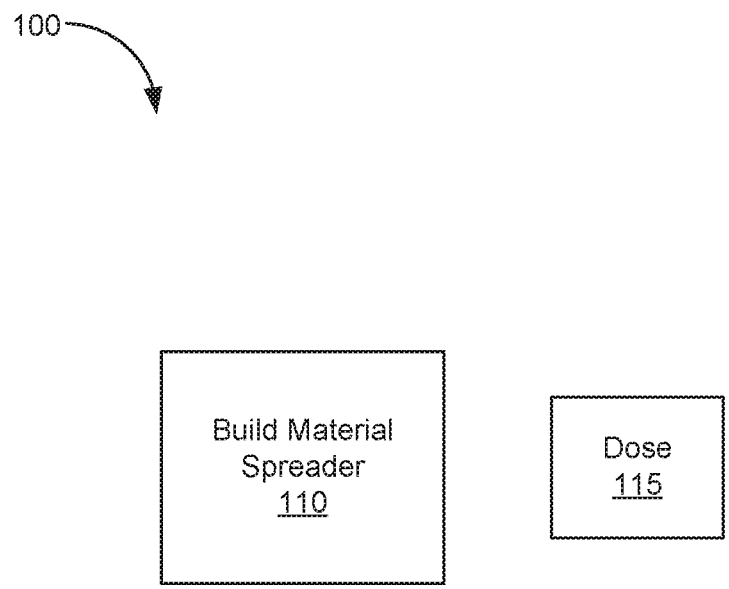
FIG. 1 is a block diagram of an apparatus according to an example of the principles described herein

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some additive manufacturing systems such as three-dimensional (3D) printing systems use build material that have a powdered or granular form. In these examples, the build material may include a semi-crystalline thermoplastic material, metals, plastics, ceramics, glass, composites, resins, graphene-embedded plastics, polymers, photopolymers, thermoplastics, other build materials, and combinations thereof. Different build materials may have different characteristics, such as different average particle sizes, different minimum and maximum particle sizes, different coefficients of friction, different angles of repose, other mechanical and physical properties, and combinations thereof. In other examples non-powdered build materials may be used such as, for example, gels, pastes, and slurries.

Some manufacturing systems may provide, along a side of a build platform, a quantity of build material to be spread over the build platform to form a thin layer of build material on the build platform. The quantity of build material may be referred to herein as a "dose" of build material. Portions of the layer of build material may then be solidified, using any suitable solidification technique, such as fusing agent deposition and heating systems, binder agent deposition systems, laser sintering systems, and other binding processes and techniques.

During an additive manufacturing operation, an initial layer of build material may be spread directly on the surface of a build platform, and subsequent layers of build material may be formed on a number of previously deposited and formed layers of build material. Herein, reference to forming a layer of build material on the build platform may refer, depending on the context, either to forming a layer of build material directly on the surface of the build platform, or to forming a layer of build material on a previously formed layer of build material.

In some additive manufacturing systems, some of the build material may not be uniformly distributed about the build platform. This non-uniformity may lead to poor-quality finished products or parts due to the density of the build material not being uniform throughout a spread layer of the build material. The non-uniformity may be from a front side to a back side and/or side to side of a build zone of the build platform and may be non-uniform as between successive layers of the build material. This may result, in an example, in the temperature of the deposited build material being non-uniform. This is because the build material may impart certain insulating characteristics to the solidification of the build material. In some examples, too much build material surrounding portions of the build material to be solidified may result in extra heat being imparted to those portions.

Further, in some additive manufacturing systems, excessive amounts of build material may be spread across the build platform. This may result in excessive cooling of both the spread material and the 3D object being formed. Cooling of the build material and the 3D object being formed on the build platform may cause successive layers of the 3D object from completely binding with one another.

The present specification describes an apparatus that includes a build material spreader to spread the dose of build material over a length of the build platform wherein lateral portions of the build material spreader have a diameter smaller than a medial portion of the build material spreader. The smaller diameter of the lateral portions of the spreader causes the build material to be spread relatively more evenly on the build platform, resulting in a relatively better printed product.

The present specification further describes additive manufacturing system that includes a build material dispensing system, the build material dispensing system including a build material spreader, a controller to cause the spreader to move over a build platform to form a layer of build material thereon, wherein the build material spreader comprises lateral portions having a smaller diameter than at a medial portion of the build material spreader.

The present specification also describes a build material spreader system that includes a roller comprising lateral portions having a diameter smaller than a medial portion of the roller wherein the entire length of the roller is implemented to spread an amount of build material over a build platform.

Turning now to the figures, FIG. 1 is a block diagram of an apparatus (100) according to an example of the principles described herein. The apparatus (100) may include a build material spreader (110) to spread a dose (115) of build material over a length of the build platform. In an example, the apparatus (100) may further include a build platform to receive the dose (115) of build material during operation of the apparatus (100).

In an example, the apparatus (100) may be or form a part of any additive manufacturing device such as an additive three-dimensional (3D) printing device. The apparatus (100) may be part of any additive manufacturing system. Such an additive manufacturing system may use any process to form an object by depositing layers of material to create the object. These layer deposition processes may include a powder bed and inkjet 3D printing process, selective laser melting (SLM), direct metal laser sintering (DMLS), selective laser sintering (SLS), fused deposition modeling (FDM), stereolithography (SLA), and laminated object manufacturing (LOM), among others. For ease of understanding, the examples described herein will be described in connection with a powder bed and inkjet 3D printing process where a layer of build material is spread along a surface of the build platform. A fusing or binding agent may then be selectively deposited by a liquid dispensing device such as, for example, a fluidic die, an inkjet printhead, a thermal inkjet printhead, a piezoelectric inkjet printhead, or other liquid deposition device. A heat source may be used to warm and/or fuse the build material together at the molecular level by using the binding agent as a heat catalyst. This process is performed a number of times over a number of build material and/or binding agent layers until a 3D object or part is produced.

The apparatus (100) may include a build material spreader (110) to spread a dose (115) of the build material along the build platform. The build material spreader (110) may be a type of device that may spread a dose (115) of build material across the build platform such as a blade, a roller, a scrapper, among others. For ease of understanding, the build material spreader (110) will be described herein as a roller that spans across a portion of one planar dimension of the build platform to form a level and uniform layer of the build material along the surface of the build platform. In this example where the build material spreader (110) is a roller, the roller may counter-rotate such that the roller rotates in a direction opposite to its movement relative to the build platform. Throughout this description, the terms "build material spreader" and "roller" may be used interchangeably.

As mentioned, the build material spreader (110) may span across one planar dimension of the build platform. In an example, the length of the build material spreader (110) may be shorter than the width of the at least one planar dimension of the build platform. In an example, the length of the build material spreader (110) may be shorter than the width of the at least one planar dimension of the build platform so as to fit between two opposing walls formed to the side of the build platform. Because layers of build material are added to a surface of either the build platform or a layer of build material formed on the build platform, the entire perimeter of the build platform may be formed within a channel that the build platform may vertically move in order to receive additional layers of build material. The build material spreader (110) may, therefore be formed to as to fit between at least two of those walls. The difference in distance between the walls formed around the build platform and the build material spreader (110) may be between 0 and 10 mm. In an example, the difference in distance between the walls formed around the build platform and the build material spreader (110) may be between 2 and 8 mm. In an example, the difference in distance between the walls formed around the build platform and the build material spreader (110) may be between 4 and 6 mm.

The build material spreader (110) has lateral portions that are further from the surface of the build platform and subsequent layers of build material deposited thereon) than a medial portion of the build material spreader (110). In the example where the build material spreader (110) is a roller, the diameter of the roller is reduced towards the lateral portions of the roller compared to the medial portion of the roller. In the example, where the build material spreader (110) is a blade or scrapper, the lateral portions of the blade or scrapper are further from the surface of the build platform than a medial portion of the blade or scrapper. Although the build material spreader (110) is described as having lateral portions that have a diameter smaller than a medial portion of the build material spreader (110), it is to be understood that although the build material spreader (110) in some examples is not a roller (and therefore does not include a "diameter") the term "diameter" indicates generally that the portions of the lateral portions of the build material spreader (110) are further from a plane formed by the build platform than the portions of the medial portions of the build material spreader (110). In these examples, smaller diameter portions of the build material spreader (110) contacts the build material during use to both receive a portion of the dose (115) of build material and spread the build material over the build platform. In these examples, the lateral portions of the build material spreader (110) come in contact with the build material.

The interface between the lateral portions of the build material spreader (110) and the medial portion of the build material spreader (110) may be stepped. In this example, the medial portion of the build material spreader (110) may have a diameter that extends closer to the build platform. In this example, the lateral portions of the build material spreader (110) have a diameter that extends further away from the build platform than the medial portions of the build material spreader (110), In an example, difference in diameter between the lateral and medial portions of the build material spreader (110) may be 0 to 1.5 mm. In an example, this difference in diameter is 1 mm.

The longitudinal length of the lateral portions of the build material spreader (110) may be formed based on a number of characteristics of the apparatus (100), the build material, the process used to form the 3D object, the temperatures used to solidify the build material, the speed of the process used, among other characteristics. In an example, the length of the lateral portions of the build material spreader is between $1/20^{th}$ and ½ the length of the total length of the build material spreader (110). length of the lateral portions of the build material spreader is between $1/10^{th}$ and ⅓rd the length of the total length of the build material spreader. In an example, the length of the lateral portions of the build material spreader is $1/20^{th}$ the length of the total length of the build material spreader.

In an example, the stepped build material spreader (110) may include a single change in distance of the surface of the build material spreader (110) from the build platform along the length of the build material spreader (110). In this example, two changes at the lateral portions of the build material spreader (110) are made. In another example, the stepped build material spreader (110) may include multiple changes in distance of the surface of the build material spreader (110) from the build platform. In this example, multiple changes in distance of the build material spreader (110) from the build platform are formed into the build material spreader (110) resulting in at least three different distances of the surface of the build material spreader (110) to the build platform as the build material spreader (110) is interfacing with the build platform.

In an example, the interface between the lateral portions of the build material spreader (110) and the medial portion of the build material spreader (110) is tapered. In this example, any type of gradual change in diameter between the medial portion and the lateral portions of the build material spreader (110) may be contemplated. In these examples, the tapering may include a convex or concave curvature. The curvature may be at any degree of curvature and may be defined by any continuous function. In an example, a transition between a medial portion of the build material spreader (110) and the lateral portions of the build material spreader (110) may include a parabolic curve, a logarithmic curve, an exponential curve, among other types of curves.

In an example, a longitudinal center of the build material spreader (110) may have a maximum diameter and taper to a minimum diameter at the lateral portions of the build material spreader (110). In this example, a gradual change from the maximum to the minimum diameter may be formed. In an example, the difference the change in diameter may be exponential until the minimum diameter at the lateral portions of the build material spreader (110) is realized. In any example, the change in diameter between the medial portion of the build material spreader (110) may begin at any position along the longitudinal width of the build material spreader (110). In the present specification, therefore, any type of change in diameter between the medial portion and the lateral portions of the build material spreader (110) may be realized as long as the diameter at the lateral portions of the build material spreader (110) is smaller than a medial portion of the build material spreader (110).

During operation, the change in the diameter of the build material spreader (110) may serve at least two purposes. During operation, an amount of the build material may be formed on a stage adjacent to the build platform. The stage may serve as a build material deposition platform from which the build material spreader (110) may receive a dose (115) of build material to be spread onto the build platform and/or a previously layer of build material formed on the build platform. As the build material spreader (110) receives the dose, less build material is accessed by the lateral portions of the build material spreader (110). This may modify the dose (115) profile such that less build material is moved onto the build platform and/or previous layer of build material by the lateral portions of the build material spreader (110).

Figure 2A:
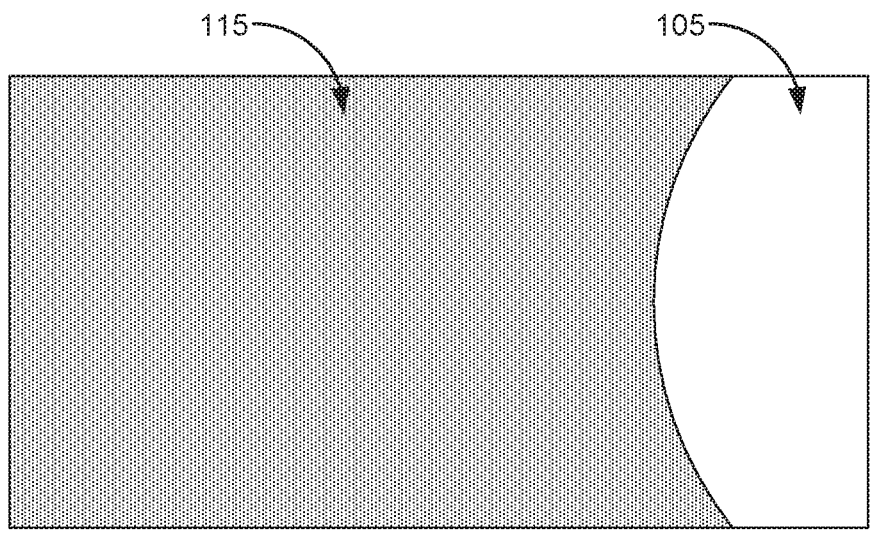
FIGS. 2A and 2B show a top plan view of a build platform after receiving a dose of build material according to two examples of the principles described herein.
Figure 2B:
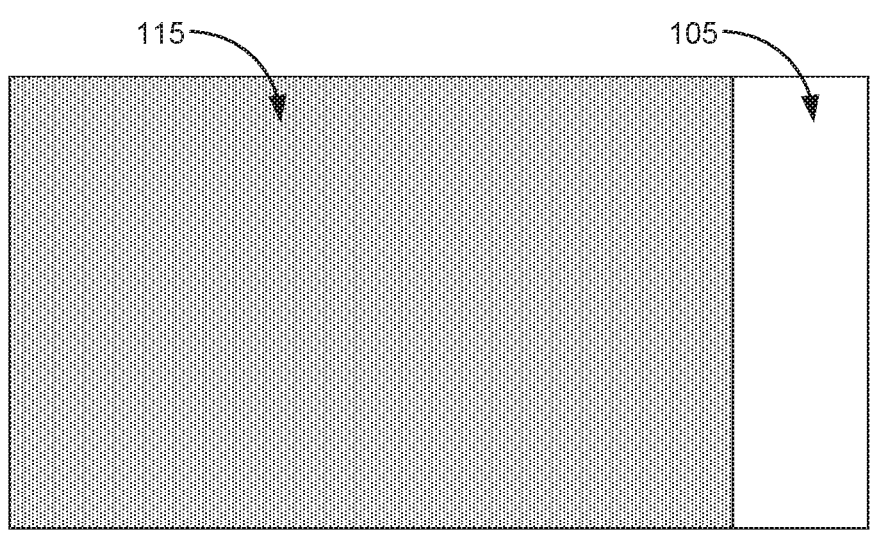

Additionally, the modification of the dose (115) creates a two-tiered layer profile of the build material on the build platform of the apparatus (100). At the location where the lateral portions of the build material spreader (110) has created a different height in the build material, the 3D object may not be printed. In examples where the diameter of the build material spreader (110) does not change along the longitudinal length of the build material spreader (110), the build material may be spread unevenly over the build platform resulting in relatively more build material being pushed out to the lateral portions of the build material spreader (110). This creates a horseshoe shaped pattern of build material at the ends of the build platform where the build material spreader (110) is finishing the spreading of the build material. Consequently, this reduces the usable space the apparatus (100) may print a 3D object within. Even further, this causes unexpected thermal changes in the build material not insulating heated portions of the build material as expected. The build material spreader (110) described and claimed in the present specification, with its changing diameters, allows the build material to be spread out such that the build material is not spread out towards the lateral portions of the build material spreader (110). Consequently, as the build material spreader (110) is finishing a spreading process towards a terminal portion of the build platform, the terminal portion profile of the build material for that deposited layer is relatively straighter. FIG. 2A shows a top plan view of a profile of build material after being spread by a build material spreader (110) not having changes to its diameter while FIG. 2B shows a top plane view of a profile of build material after being spread by a build material spreader (110) described herein. As can be seen from these two figures, the spreading of the build material by the build material spreader (110) described herein in the direction of the arrow (120) causes the build material to create a relatively straighter terminal line. Again, this is because of the diameter of the lateral portions of the build material spreader (110) being smaller than the medial portions of the build material spreader (110).

In an example, the apparatus (100) may further include a build material deposition device to place a dose (115) of build material onto the shelf as described herein. The build material deposition device, in an example, may be a hopper that proceeds the build material spreader (110) and places a metered amount of build material in front of the build material spreader (110) before the build material spreader (110) spreads the build material onto the build platform.

The apparatus (100) may further include an agent dispenser and an energy emitting device including a warming lamp. The agent dispenser may dispense a binding or fusing agent onto spread along the surface of the build platform. The energy emitting device may be moveably coupled to a carriage and may move along with the build material deposition device in order to warm the build material and/or fuse the build material as described herein.

Figure 3:
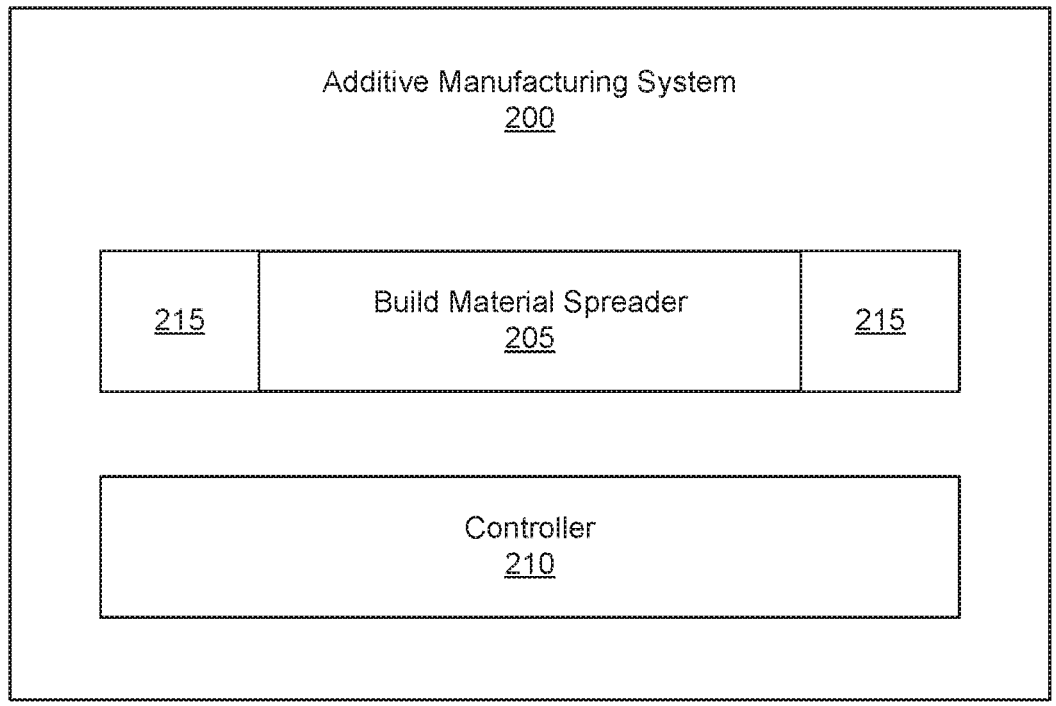
FIG. 3. is a block diagram of an additive manufacturing system according to an example of the principles described herein.

FIG. 3. is a block diagram of an additive manufacturing system (200) according to an example of the principles described herein. The additive manufacturing system (200) may include, at least, a build material spreader (205) and a controller (210).

The build material spreader (110) may be similar to the build material spreader (FIG. 1, 110) as described herein in connection with FIG. 1. The build material spreader (205) may include lateral portions (215) having a smaller diameter relative to a medial portion of the build material spreader (205). The difference in diameter may be due to a stepped change in diameter along a lateral portion of the build material spreader (205). The difference in diameter may be due to a gradual change in diameter along a lateral portion of the build material spreader (205). The build material spreader (205) may be a roller, a blade, or a scrapper.

The controller (210) may include the hardware architecture to retrieve executable code from a data storage device and execute the executable code. The executable code may, when executed by the controller (210), cause the controller (210) to implement at least the functionality of passing the build material spreader (205) across a build platform according to the methods of the present specification described herein. In the course of executing code, the controller (210) may receive input from and provide output to a number of remaining hardware units within the additive manufacturing system (200).

Figure 4:
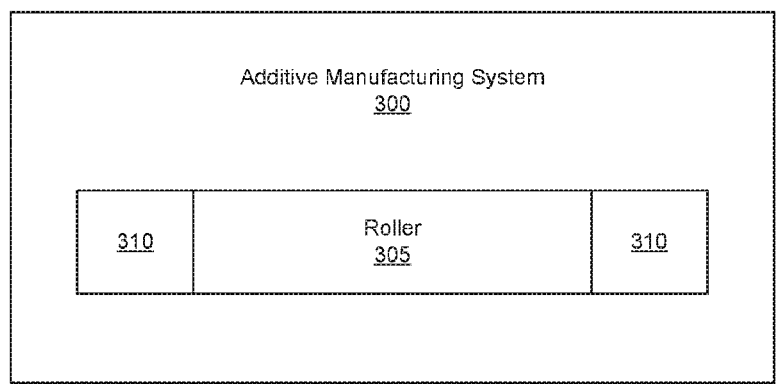
FIG. 4 is a block diagram of a build material spreader system according to an example of the principles described herein.

FIG. 4 is a block diagram of a build material spreader system (300) according to an example of the principles described herein. The build material spreader system (300) may include a roller (305) including lateral portions (310) having a diameter smaller than a medical portion of the roller (305). The length of the roller (305) may be used to spread the amount of build material over the platform. As described herein, the lateral portions (310) of the roller (305) are placed at a further distance from a build platform than a medial portion of the roller (305). However, during a spreading operation controlled by a controller (FIG. 2, 210) to activate the roller (305) causing the roller (305) to pass over the build platform (FIG. 1, 105), the entire length of the roller (305) comes in contact with the build material. In this example, the roller (305) may prevent a portion of the spreading build material to pass towards the lateral portions of the roller (305) thereby preventing the non-uniform blanketing of the build material over the build platform.

With reference to FIGS. 5 through 14, a description of the functioning of the additive manufacturing system (200) will now be described. The state of the additive manufacturing system (200) depicted in FIG. 5 may be an initial state before a first layer of build material (150) is deposited on a stage (204) and build platform (202) or between deposition and binding of successive layers of the build material (150).

Figure 6:
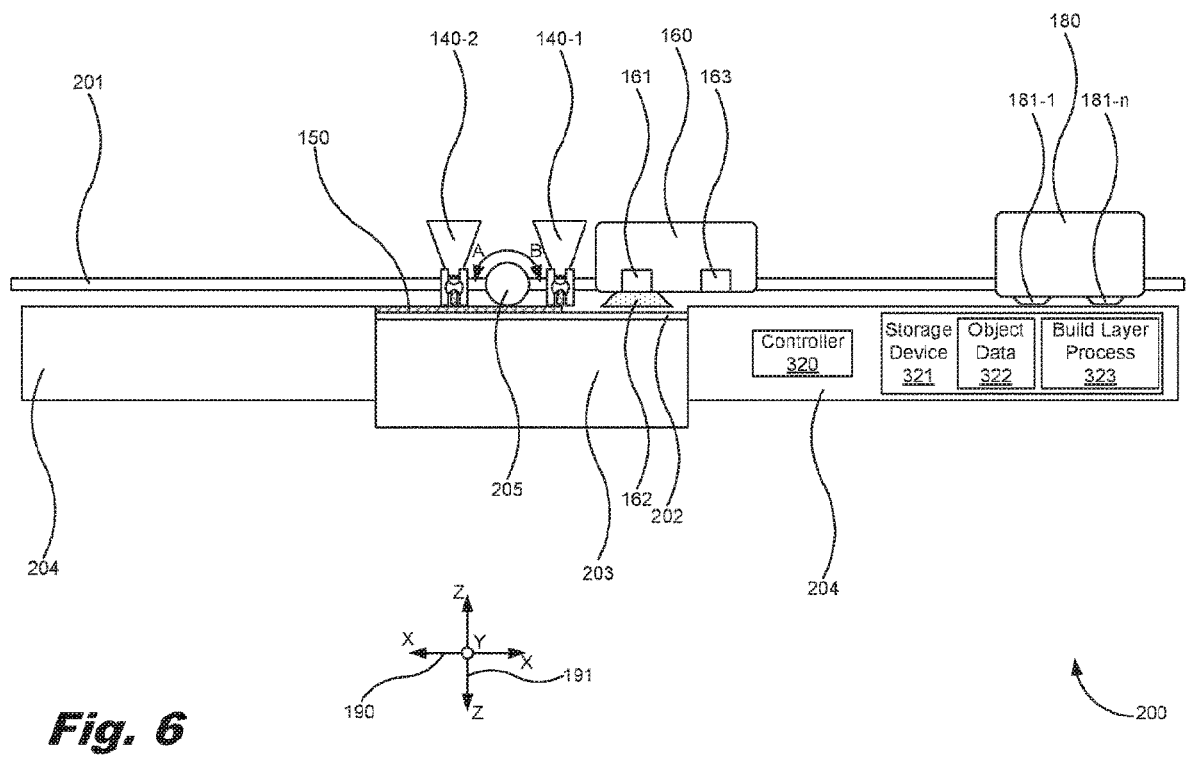

FIG. 6 depicts the additive manufacturing system (200) in a state in which the build material (150) is deposited on the build platform (202). The build platform (202) and the build platform base (203) may be moved downward in the z-direction as indicated by arrow (191) to provide for the layer of build material (150) to be formed on the build platform (202), and, in one example, to approximately the level of the stage (204). During the state depicted in FIG. 6, a warming lamp (161) may be actuated and its warming electromagnetic radiation (162) may be used to warm the build platform (202) and the environment around the build platform (202) to assist in maintaining the build material (150) at a consistent temperature. At this state, the fusing lamp (163) and its fusing electromagnetic radiation (164) may not be activated since a binding or fusing agent has not been dispensed on the layer of build material (150). In an example, the fusing lamp (163) may emit radiation during the entire process, although the magnitude of the emissions may vary depending on which of the processes of the layer formation being conducted.

It is noted that in FIG. 6, the first hopper (140-1) and the second hopper (140-2) both dispense build material (150) in front of and behind the build material spreader (205), respectively. This allows for additional amounts or doses (FIG. 1, 115) of the build material (150) to be made available to the build material spreader (205) for spreading across the build platform (202) while simultaneously maintaining a constant amount of build material (150) in front of the build material spreader (205) during any and all passes of the additive manufacturing system (200). Further, the build material spreader (205) as described herein with its variable diameter allows for better spreading of the build material across the build platform (202).

Figure 7:
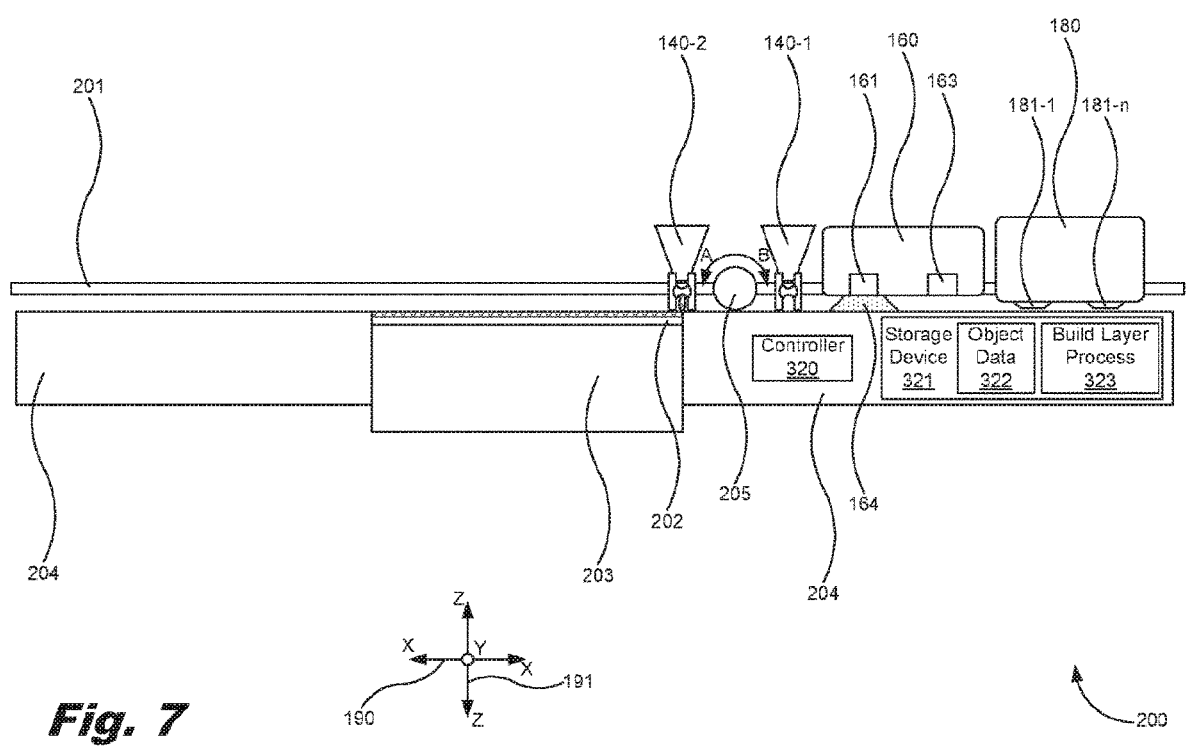

In FIG. 7, the additive manufacturing system (200) may be in a state where a material dispensing device has completed a first build material (150) dispensing pass along with a simultaneous first warming pass. In one example, the warming lamp (161) and its warming electromagnetic radiation (162) may continue to warm the stage (204) and any build material (150) dispensed thereon in preparation of a second dispensing and spreading pass. Further, the carriage (201) may, at this point, cause the build material spreader (205) to lift up in the positive z-direction as indicated by arrow (191) as it passes the portion of the build platform (202) from left to right so that any build material (150) dispensed by the hopper (140-1) may not be further spread across the right side of the stage (204). In this manner, the build material spreader (205) may skip over any build material (150) dispensed by the hopper (140-1), and spread that build material (150) dispensed by the hopper (140-1) during the next pass from the right to the left over the build platform (202). Doing this will allow the additive manufacturing system (200) to conserve build material (150) and not create a situation where excess build material (150) is moved to unusable portions of the additive manufacturing system (200) such as along the surface of the stage (204) past the effective reach of the build material spreader (205) or the doctor blades of the hoppers (140).

Figure 8:
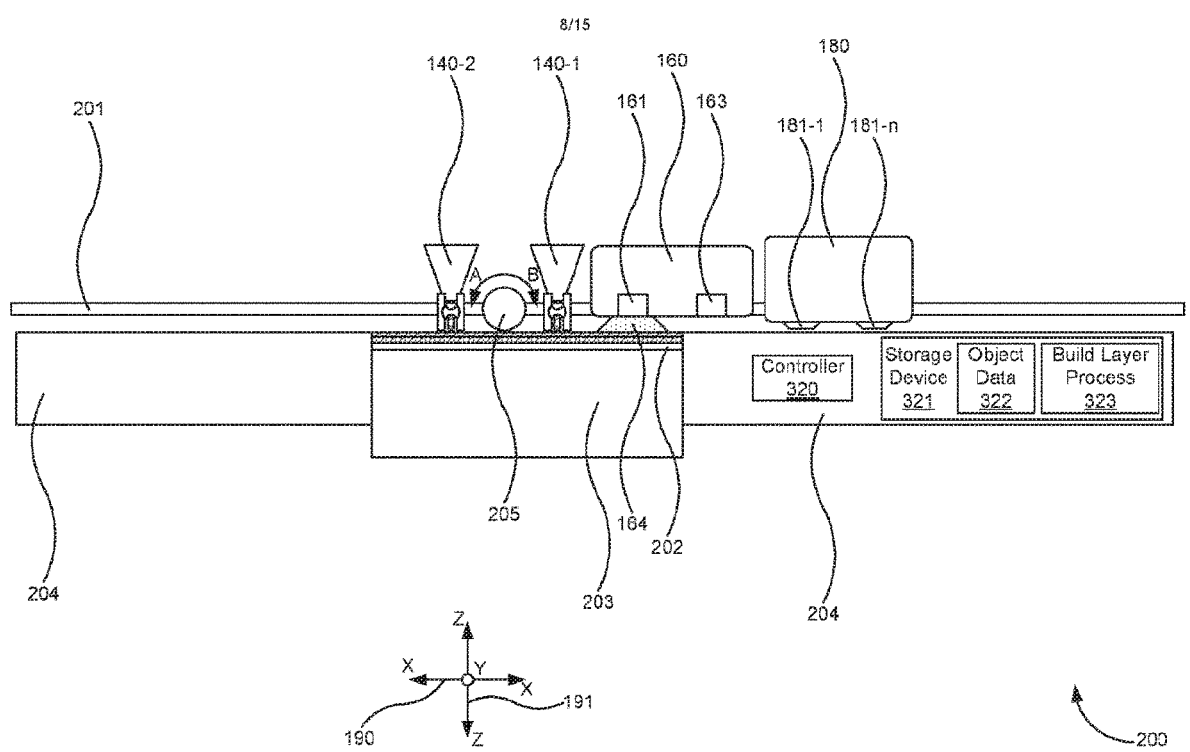

Thus, in FIG. 8, the second pass of building material (150) is depicted including additional build material (150) being dispensed by the first hopper (140-1) and the second hopper (140-2) behind and in front of the build material spreader (205), respectfully. The build material spreader (205) in this pass is rotating in the direction of arrow B so that it counter-rotates relative to the direction of travel of the devices of the additive manufacturing system (200).

The warming lamp (161) may remain on during this second pass to heat the build material (150) already dispensed and the build material (150) that is dispensed in this second pass. Again, the build material spreader (205) rotates in the direction of arrow B so that it is counter-rotating with respect to the direction of travel from the right to the left.

Figure 9:
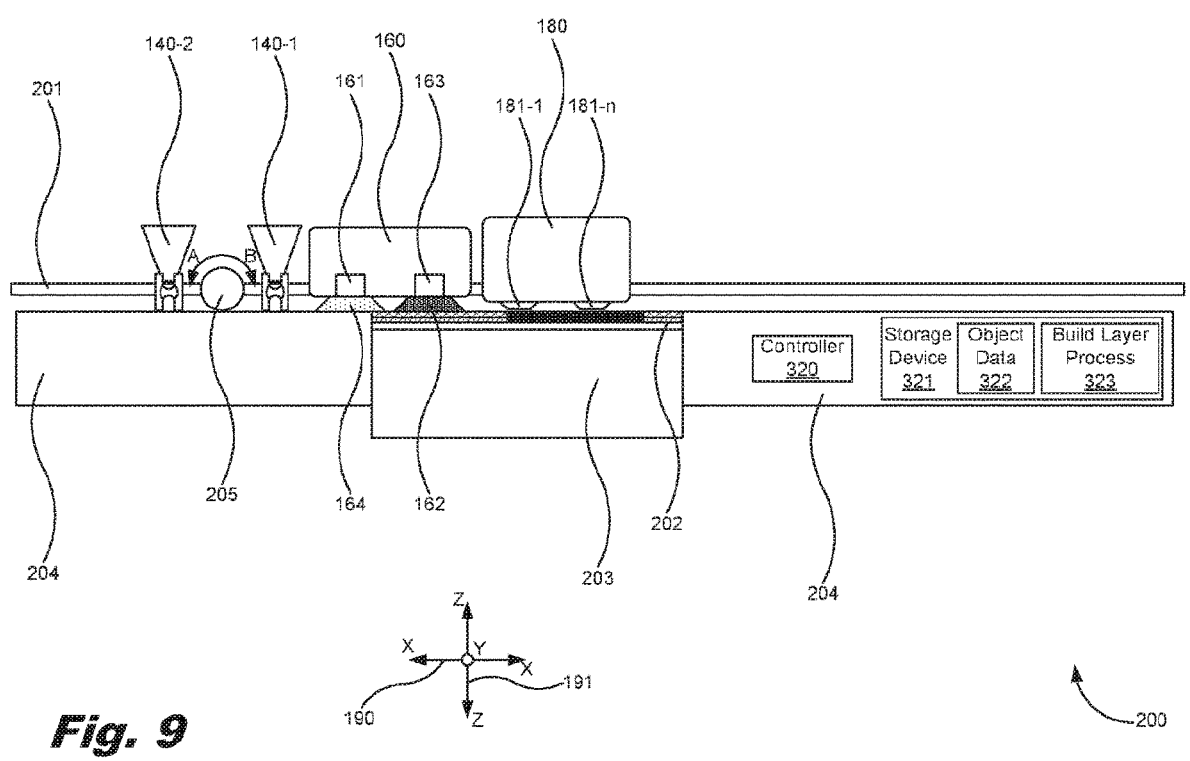

In FIG. 8, the agent dispenser (180) begins to move from its home position on the right of the build platform (202), in the left direction along with the energy emitting device (160) and the build material dispensing device (100) in preparation for dispensing an amount of binding agent (185) onto the twice dispensed and spread build material (150) on the build platform (202). In FIG. 9, the agent dispenser (180) dispenses the binding agent (185) in a pattern onto the building material (150) in its first pass over the build platform (202) and third pass of the energy emitting device (160) and the build material dispensing device (100) over the build platform (202).

Figure 10:
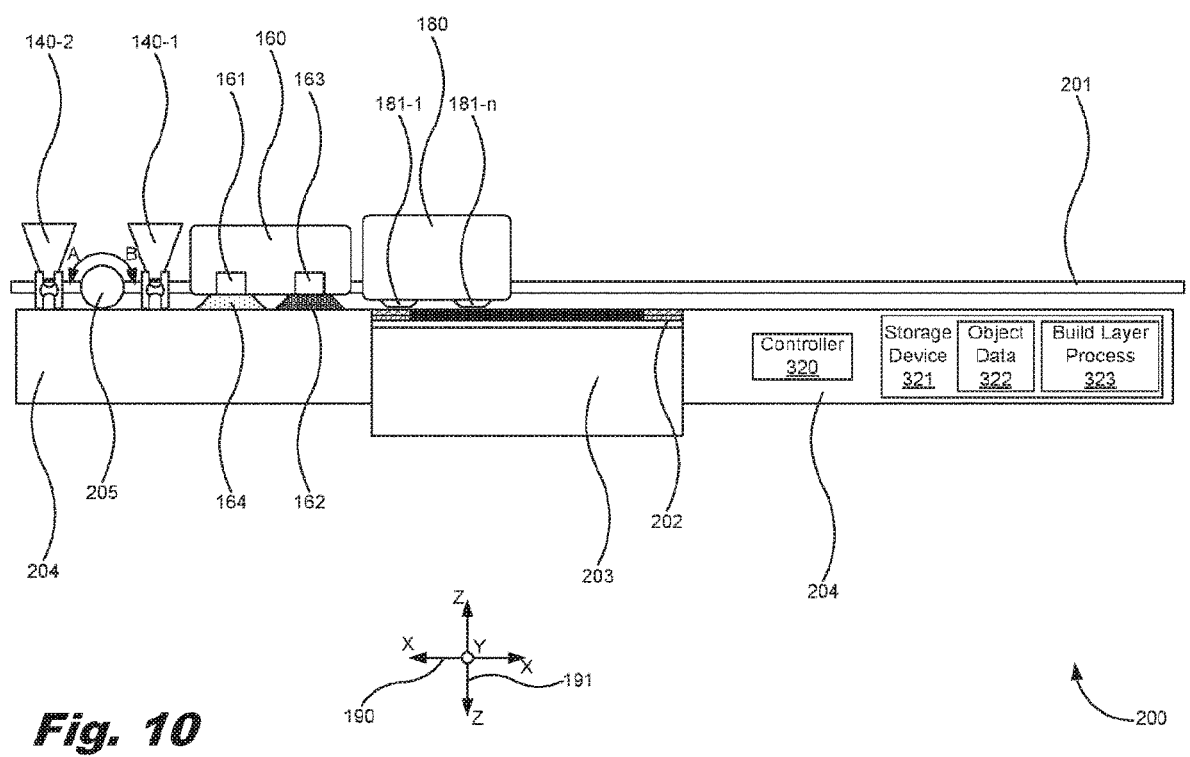

In FIG. 10, the agent dispenser (180) completes its first pass over the build platform (202) while dispensing the binding agent, and begins a second pass over the build platform (202) to dispense another amount of the binding agent. The deposition of the binding agent during this second pass of the agent dispenser (180) may or may not be performed during the first pass of the agent dispenser (180) and its deposition of the binding agent during that first pass may be sufficient in some examples. However, in another example, the agent dispenser (180) dispenses binding agent during both of its passes over the build platform (202). In one example, the agent dispenser (180) dispenses the binding agent within a target area of the build platform (202) that is smaller than the full length and width of the build platform (202).

Figure 11:
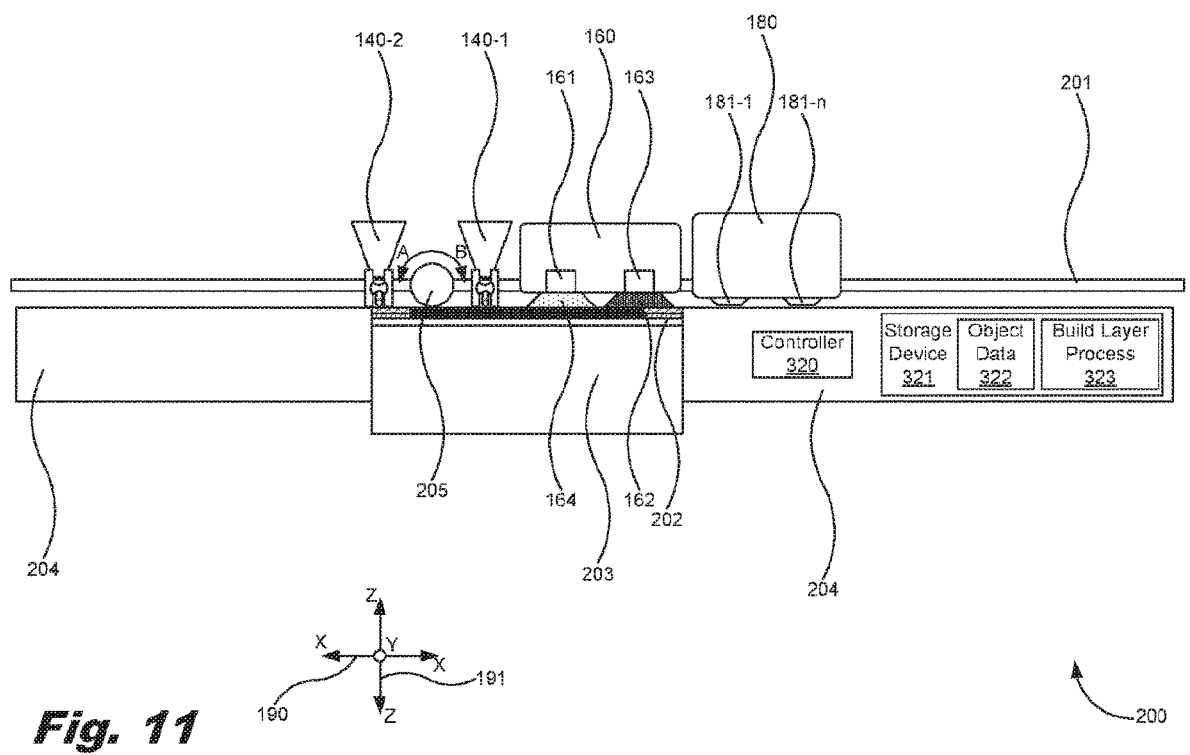

In FIG. 11, as the agent dispenser (180) completes its second pass over the build platform (202), the fusing lamp (163) may be activated to cause its fusing electromagnetic radiation (164) to fuse or bind the build material (150) together through the use of the binding agent. While the agent dispenser (180) completes its second pass and the fusing lamp (163) is activated, the hoppers (140) may dispense an amount of build material (150) and the material spreader (120) may spread that deposited build material (150). However, since the fusing lamp (163) may be activated in a subsequent pass back to the left, in another example the hoppers (140) may not dispense build material (150) and the material spreader (120) may not activate in this third pass. Further, the energy emitting device (160) may also activate its warming lamp (161) to emit its warming electromagnetic radiation (162) to keep the build material (150), fused layers of the 3D object, and the surrounding environment at a consistent temperature.

Figure 12:
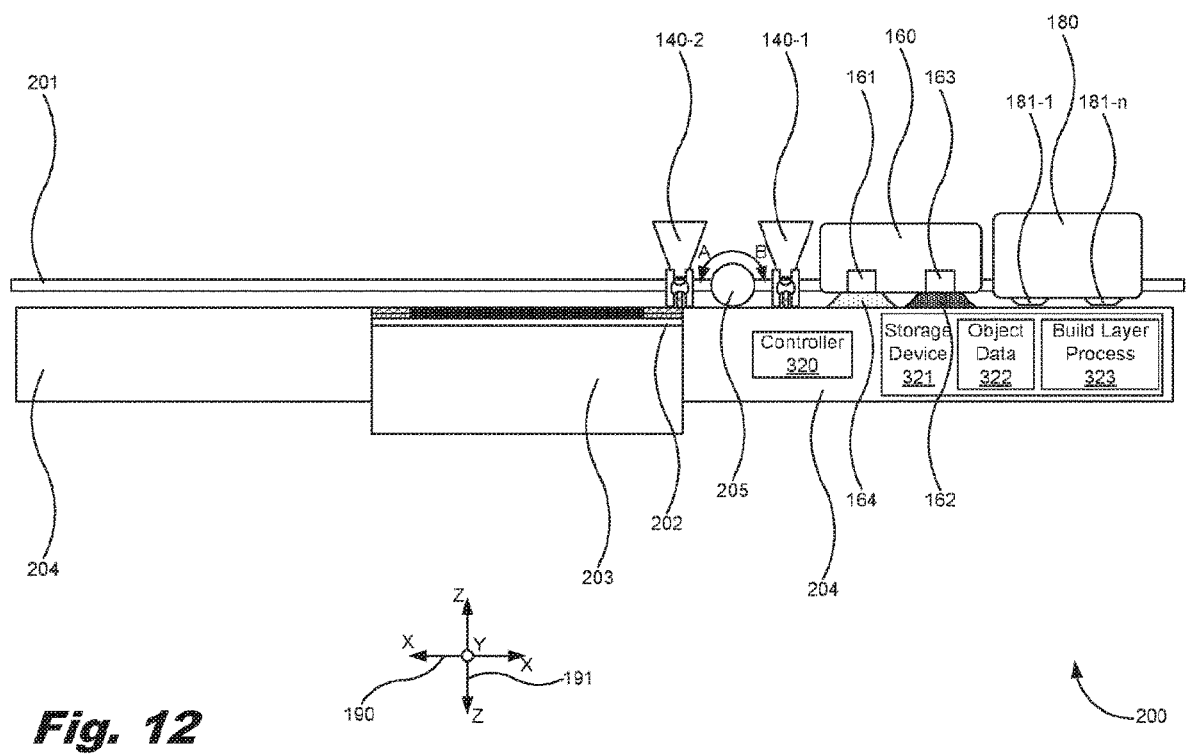
Figure 13:
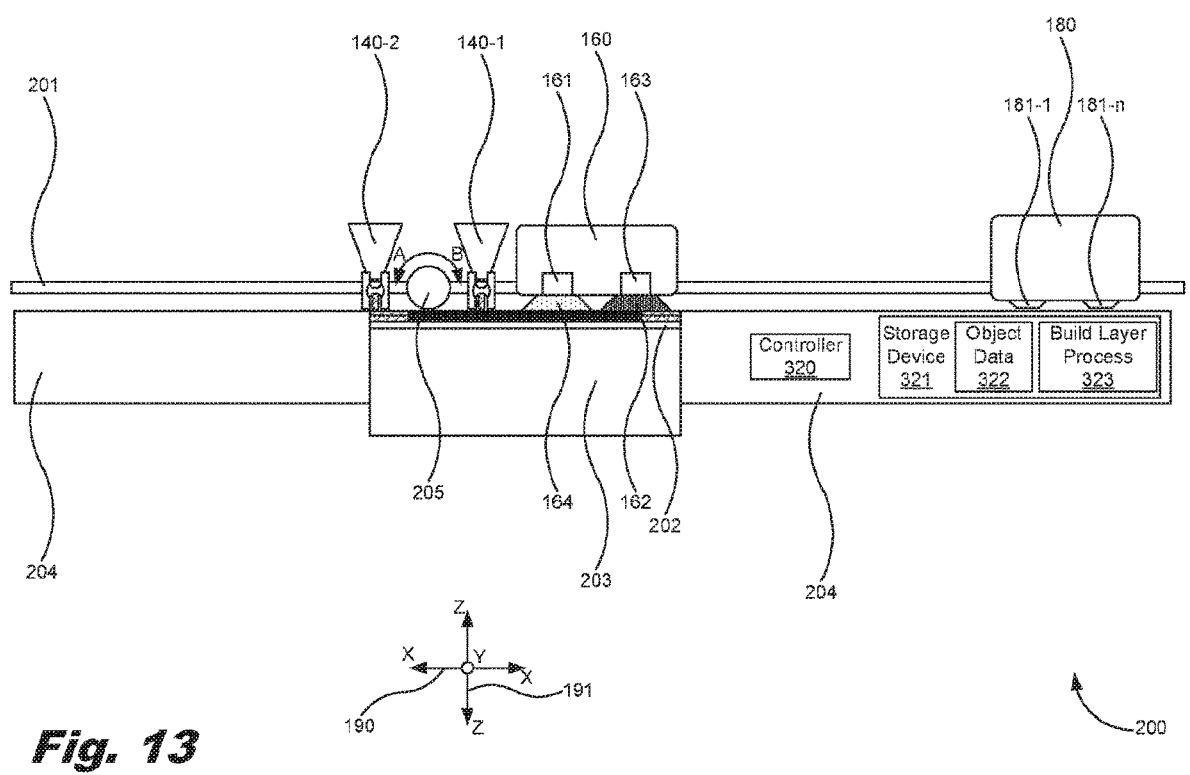

At FIG. 12, the material dispensing device (100), the energy emitting device (160), and the agent dispenser (180) return to the right of the build platform (202) completing its third pass. At this point, the agent dispenser (180) is left on the right side of the build platform (202), and the material dispensing device (100) and energy emitting device (160) make a fourth pass over the build platform (202). As the material dispensing device (100) and energy emitting device (160) make this fourth pass as depicted in FIG. 13, the fusing lamp (163) may be again activated during this fourth pass to again cause its fusing electromagnetic radiation (164) to fuse or bind the build material (150) together through the use of the binding agent. This second fusing or binding pass may assist in ensuring that the entirety of the build material (150) that is exposed to the binding agent is fused.

Figure 5:
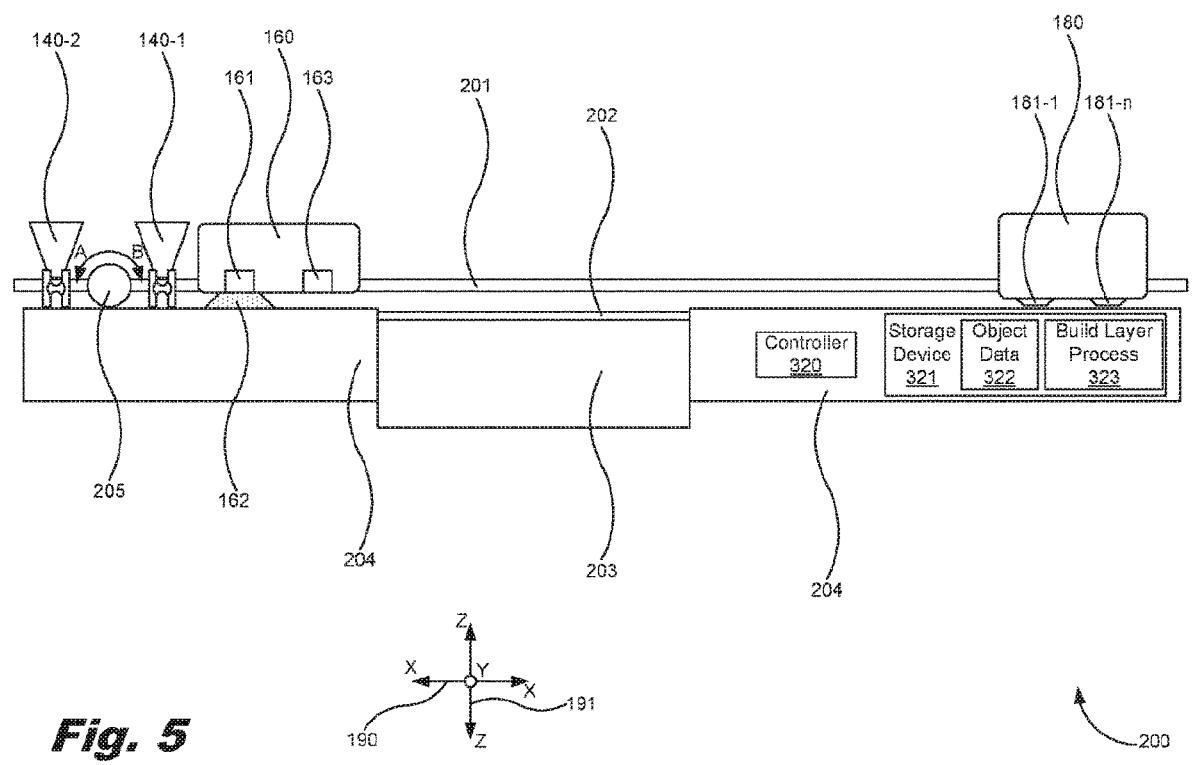
FIGS. 5 through 14 show a number of block diagrams depicting the functioning of an additive manufacturing system according to an example of the principles described herein.
Figure 14:
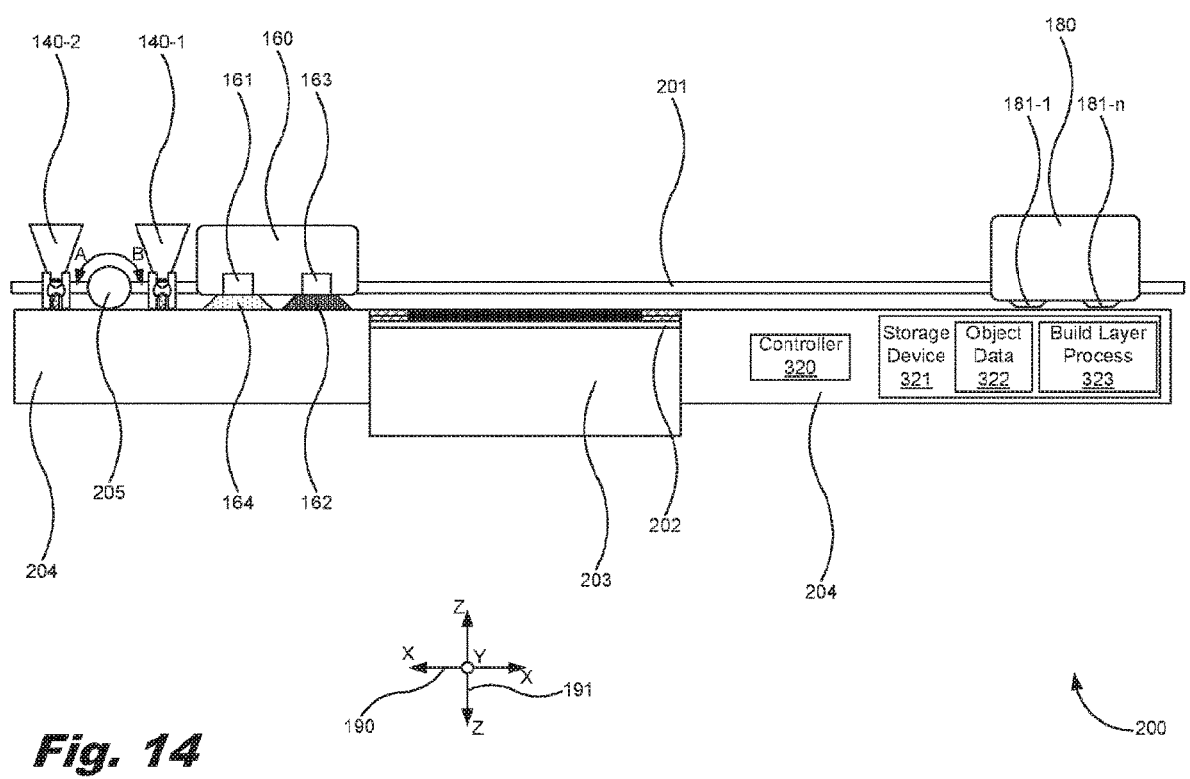

At FIG. 14, the material dispensing device (100) and energy emitting device (160) return back to the initial position as depicted in FIG. 5. The process of FIGS. 5 through 14 may be performed any number of iterations in order to form a 3D object. Thus, when the process begins at FIG. 5 again, the fusing lamp (163) may be again activated for a third time during this subsequent first pass to again cause its fusing electromagnetic radiation (164) to fuse or bind the build material (150) together through the use of the binding agent.

The process of FIGS. 5 through 14 may include a number of processes using the build material spreader (205), the hoppers (140), energy emitting device (160), and the agent dispenser (180) and may include a number of sub-processes effected by these devices. Thus, the first pass may include a fusing process using the fusing lamp (163) to fuse build material (150) from a previous layer formation for a third time. This first pass may also include a warming process using the warming lamp (161), and a build material (150) deposition and spreading process using the build material spreader (205) and hoppers (140) of the material dispensing device (100).

The second pass may include a second build material (150) deposition and spreading process, a second warming process, and a first binding agent dispensing process using the agent dispenser (180). The third pass may include a second binding agent dispensing process, a second fusing process using the fusing lamp (163), and a third warming process using the warming lamp (161). The fourth pass may include a fourth warming process using the warming lamp (161) and a third fusing process. In this manner, a single layer of the 3D object may be formed, and the process may be performed a number of times to form subsequent layers of the 3D object. Between instantiations of this four-pass process, the build platform (202) may move down with respect to arrow (191) to accommodate for the layers of build material (150) added and fused within the 3D object.

The processes described in connection with FIGS. 5-14 are merely an example. The present specification contemplates the process and/or portions of the processes to be conducted out of order as described herein.

FIGS. 5-14 further show the controller (210) along with a storage device (321) including object data (322) and build layer process (323). The additive manufacturing system (200) may therefore include logic and circuitry to cause the additive manufacturing system (200), the hoppers (140), energy emitting device (160), the agent dispenser (180), and the build platform (202) and the build platform base (203) to move and actuate in a manner that produces a 3D object based on object data (322) stored in a data storage device (321) of the additive manufacturing system (200). For example, the additive manufacturing system (200) may include the controller (210) as described herein. The controller (210) may include the hardware architecture to retrieve executable code from the data storage device (321) and execute the executable code. The executable code may, when executed by the controller (210), cause the controller (210) to implement at least the functionality of sending signals to the build material spreader (205), the hoppers (140), energy emitting device (160), the agent dispenser (180), and the build platform (202) and the build platform base (203) to instruct these devices to perform their individual functions according to the methods of the present specification described herein. In the course of executing code, the controller (210) may receive input from and provide output to a number of the remaining hardware units.

The object data (322) stored in the storage device (321) may be obtained from an external source such as, for example, a computer-aided design (CAD) system that provides a CAD model of the 3D object defined by the object data (322). The build layer process (323) may be any data stored in the data storage device (312) that defines the process the controller (210) follows in instructing the build material spreader (205), the hoppers (140), energy emitting device (160), the agent dispenser (180), and the build platform (202) and the build platform base (203) to produce the 3D object over a number of build material (150) and fusing agent layers.

Figure 15A:
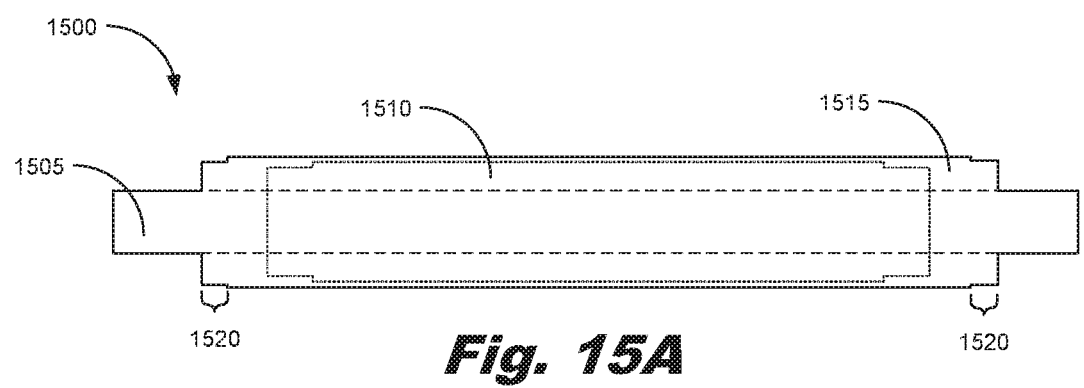
FIGS. 15A and 15B show a cut-out plan view and an exterior plan view of a build material spreader according to an example of the principles described herein.
Figure 15B:
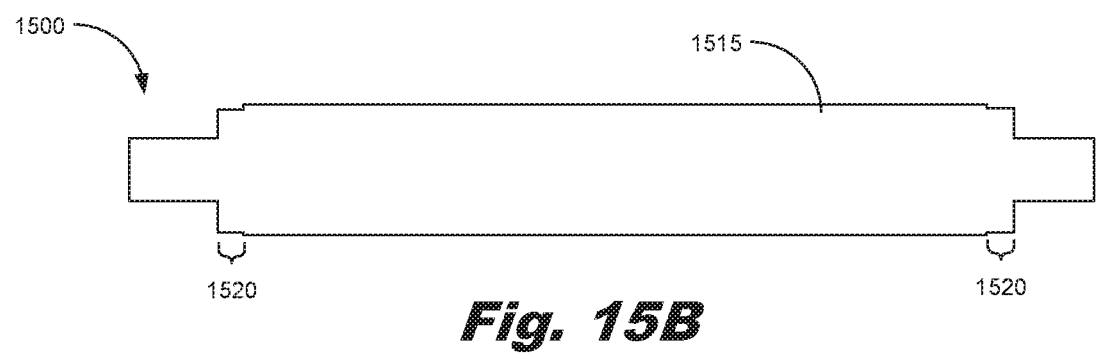

FIGS. 15A and 15B show a cut-out plan view and an exterior plan view of a build material spreader (1500) according to an example of the principles described herein. The build material spreader (1500) depicted in FIGS. 15A and 15B are meant to be merely an example and other shapes and types of build material spreaders (1500) may be used according to other examples described herein. FIG. 15A shows a cut-out plan view of the build material spreader (1500) that includes, at least, a shaft (1505), an inner portion (1510), and an outer portion (1515). The inner portion (1510) build material spreader (1500) may be made of any type of material. In an example, the inner portion (1510) is made of a non-resilient material such as a metal. The outer portion (1515) of the build material spreader (1500) may be made of any type of material. In an example, the outer portion (1515) may be made of a resilient material. The outer portion (1515) may include a surface that has a coefficient of friction that allows the build material to be pulled and spread by the build material spreader (1500).

The build material spreader (1500) may further include, in this example, a stepped portion (1520) as described herein. Although the stepped portion (1520) is shown to be of a certain length with regards to the entire length of the build material spreader (1500), it is understood that the length of the stepped portion (1520) may vary depending on a number of factors as described herein. Additionally, although the stepped portion (1520) is shown to be a reduction in diameter of the build material spreader (1500) by a certain portion of the maximum diameter of the build material spreader (1500), the diameter of the stepped portion (1520) of the build material spreader (1500) may vary depending on a number of factors as described herein.

The specification and figures describe a build material spreader that has a diameter that is not uniform across a longitudinal length of the build material spreader. The varying diameter allows for a dose of build material to be spread out relatively more evenly on the surface of the build platform. The varying diameter leaves a thicker layer of powder outside the printable area thereby providing distances between the convective losses of the build material surface (outside the build platform) and the printable area. This reduces the amount of build material dispensed to the build platform outside of the printable region as a result of the dosing system described herein. Because the dose size impacts the density of the layer, dose uniformity provides for predictable printing results. Further, even if an extremely uniform dose is provided to the build material spreader, the particle behaviour while it is being spread tends to push the powder towards the outside of the build material spreader to balance the pressures. The shape of the powder depicted in FIG. 2A is reflective of the shape of the dose as it is spread across the build platform with a build material spreader not augmented as described and claimed herein. Because the density of the build material impacts the temperature and temperature uniformity, the alterations made to the build material spreader as described herein provides for a relatively better printed 3D object.

The preceding description has been presented to illustrate and describe examples of the principles described. This description is not intended to be exhaustive or to limit these principles to any precise form disclosed. Many modifications and variations are possible in light of the above teaching.

What is claimed is:

1. An additive manufacturing apparatus, comprising:
    a build material spreader having a surface configured to spread a dose of build material over a length of a build platform to form a layer of the build material thereon;
    wherein lateral portions of the surface of the build material spreader have a diameter smaller than a medial portion of the build material spreader surface, both the lateral and medial portions of the spreader positioned to be in contact with the dose of build material during the spreading so as to create a relatively straighter terminal line of the build material being spread as compared with a corresponding build material spreader surface not having smaller diameter lateral portions relative to a medial portion thereof.

2. The apparatus of claim 1, wherein the build material spreader is a roller.

3. The apparatus of claim 2,
    wherein the entire length of the roller is configured to spread the dose of build material over the build platform.

4. The apparatus of claim 2, wherein the diametrical difference between the lateral portions of the roller and the medial portion of the roller is between 0.5 and 1.5 millimeters.

5. The apparatus of claim 2, wherein an interface between the smaller diameter of the lateral portions of the roller and the medial portion of the roller is stepped.

6. The apparatus of claim 2, wherein an interface between the smaller diameter of the lateral portions of the roller and the medial portion of the roller is sloped.

7. The apparatus of claim 1, wherein an interface between the smaller diameter lateral portions of the build material spreader and the medial portion of the build material spreader is stepped.

8. The apparatus of claim 1, wherein a length of the build material spreader is shorter than a width of the build platform.

9. The apparatus of claim 1, wherein the length of the lateral portions of the build material spreader is between $\frac{1}{20}^{th}$ and $\frac{1}{2}$ the length of the total length of the build material spreader.

10. The apparatus of claim 1, wherein the build material spreader is a wiper.

11. The apparatus of claim 1, wherein, during spreading of the build material, the lateral portions contact the build material to both receive a portion of the dose of build material and spread the build material over the build platform.

12. The apparatus of claim 1, further comprising:
    a build material dispensing system, the build material dispensing system comprising:
        the build material spreader; and
        a controller configured to cause the spreader to move over the build platform to form a layer of the build material thereon.

13. The apparatus of claim 12, wherein the build material spreader is a roller.

14. The apparatus of claim 13, wherein an interface between the smaller diameter lateral portions of the roller and the medial portion of the roller is stepped.

15. The apparatus of claim 14, wherein a diametrical difference between the lateral portions and the medial portion of the roller is between 0.5 and 1.5 millimeters.

* * * * *